April 27, 1965 R. H. WISE 3,180,757
METHOD OF CLEANING A WINDSHIELD
Original Filed Dec. 29, 1954 2 Sheets-Sheet 1
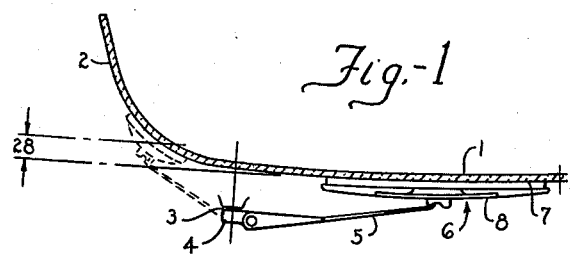
Fig.-1
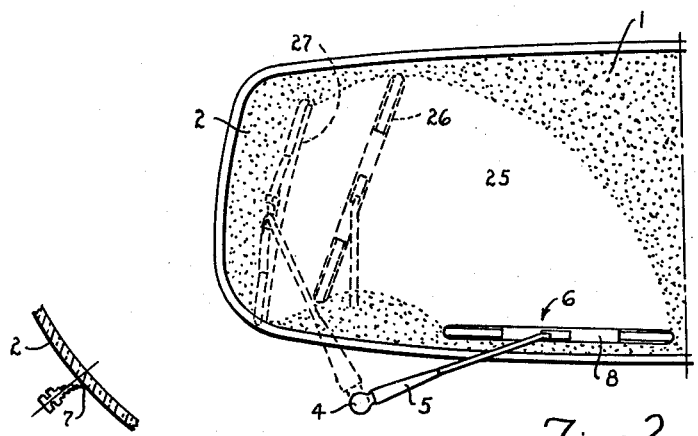
Fig.-2
Fig.-2a
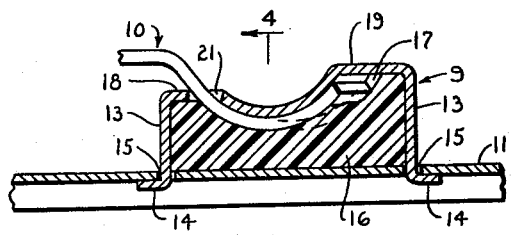
Fig.-3
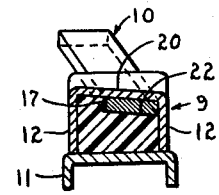
Fig.-4
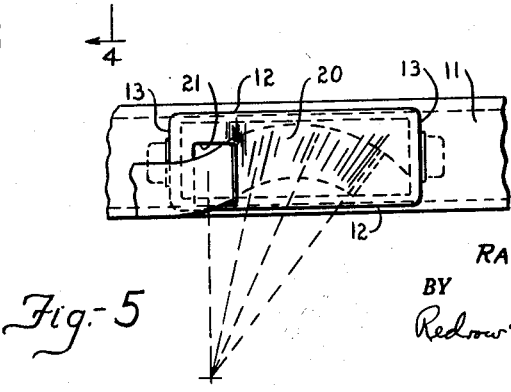
Fig.-5
INVENTOR.
RALPH H. WISE
BY
Redrow + Recktenwald
ATTORNEYS INVENTOR.
RALPH H. WISE
BY
Redrow & Recktenwald
ATTORNEYS 3,180,757
METHOD OF CLEANING A WINDSHIELD
Ralph H. Wise, Davis Island, Tampa, Fla., assignor, by mesne assignments, to The Anderson Company, a corporation of Indiana
Original application Dec. 29, 1954, Ser. No. 478,284. Divided and this application Sept. 30, 1957, Ser. No. 687,129
5 Claims. (Cl. 134—6)

This application is a division of my application, Serial No. 478,284, filed December 29, 1954, now abandoned.

This invention relates generally to windshield wiper apparatus and more particularly is directed to means for establishing a connection between a wiper arm and a blade therefor.

One of the principal objects of the invention is to provide an improved form of connection means between a wiper arm and a blade so that the blade will readily conform or accommodate itself to a windshield of the so-called wrap-around type. More specifically in this respect, the connection means is of such a character that the blade will automatically adjust itself to the arm and to the windshield as the blade travels across the frontal and side portions of the windshield. The blade in adjusting itself to the curvature of the windshield will be caused to pivot or swing in one direction with respect to the arm as the arm moves outwardly and rearwardly around the side, wing or offset portion of the windshield and then pivot or swing in a reverse direction when the blade moves back and around to the frontal portion, all of which serves to permit the blade to wipe a greater area of the windshield. In other words, the invention serves to increase and control the area wiped by the blade on the wing portion of the windshield as distinguished from a conventional connection means which would at least allow a portion of the blade to slide off the wing portion as the blade oscillates thereon.

An important object of the invention is to provide a novel assembly or connection means which, among other things, includes a housing or fitting provided with a track, guideway or seat, an entering part seated in the guideway, and means for holding the entering part in the guideway. The housing is preferably mounted on the wiper blade unit constituting a component of the assembly and the entering part is preferably carried by the wiper arm unit constituting another component of the assembly. More particularly, the guideway is curved in two directions and provided with a conical, spherical, or ellipsoidal surface and the entering part is similarly curved to conform to the seat.

A specific object of the invention is to provide an assembly in which the guideway and entering part are so designed and constructed that the blade may automatically tilt as it pivots with respect to the arm in order to maintain the blade in an erect or substantially normal perpendicular position to the surface being wiped so that the blade will properly flop during its wiping operation.

Another object of the invention is to provide an assembly of the kind above referred to which is comprised of a minimum number of parts or components which can be economically manufactured and assembled on a production basis.

Other attributes of the invention reside in its simplicity of design and construction, durability, and efficiency in operation.

Additional objects and advantages of the invention will become apparent after the description hereinafter set forth is considered in conjunction with the drawings annexed hereto.

In the drawings:

FIGURE 1 is a view showing a wiper arm unit and a blade unit embodying the invention with the blade and arm located with respect to a windshield of the wrap-around type for the purpose of exemplifying the utility of the invention;

FIGURE 2 is a front elevational view of the structure illustrated in FIGURE 1;

FIGURE 2a is a view showing the normal operating position of the wiper blade on the windshield;

FIGURE 3 is a longitudinal section taken through one of the components of the connection means with another of the components operatively connected with the first component;

FIGURE 4 is a transverse section taken substantially on line 4—4 of FIGURE 3;

FIGURE 5 is a top view of the assembly shown in FIGURE 3;

Figure 6:
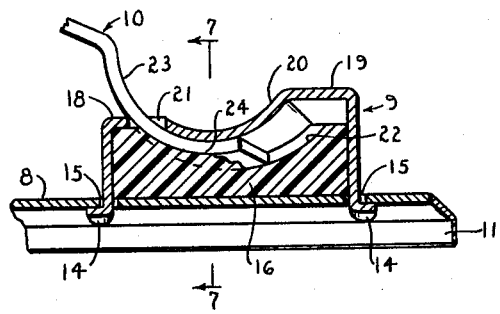
FIGURE 6 is a view similar to FIGURE 3 illustrating the relationship of the components of the connection means when the blade is traversing the side portion of the windshield.
Figure 7:
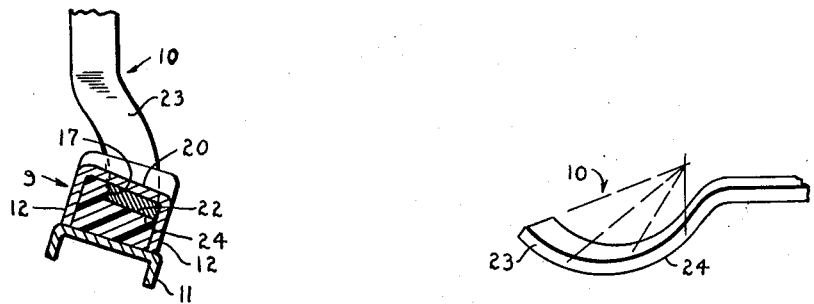
FIGURE 7 is a view similar to FIGURE 4 showing the position of the components when the blade is travelling across the side portion of the windshield.
Figure 8:
FIGURE 8 is a perspective view of the entering part carried by the wiper arm.

Referring more particularly to FIGURES 1 and 2 of the drawing, the windshield may be constructed in various shapes but as illustrated comprises a frontal portion 1 and a rearwardly extending wing or offset portion 2. A drive shaft 3 operated by a motor, not shown, is located adjacent the junction between the frontal and wing portions of the windshield. A wiper arm unit has an inner section 4 connected to the drive shaft and an outer section 5 has its inner end pivotally connected to the inner section and an outer end detachably connected to a wiper blade unit 6. Resilient biasing means, not shown, are provided for urging the wiper arm and blade carried thereby toward the windshield.

The wiper blade unit is a type currently in use for wiping flat and/or curved windshields and includes a wiping element having a wiping edge 7 and an elongated support structure 8 for the element.

The subject matter of the present invention is primarily directed to a connection means which serves to operatively connect the wiper arm unit with the blade unit. More particularly in this regard, the connection means includes a component generally designated 9 preferably carried by the structure 8 of the blade unit and a component generally designated 10, carried by the wiper arm unit.

The component 9 carried by the wiper blade and illustrated in the drawing includes an elongated housing or fitting carried by a member 11 of the support structure 8 of the blade unit. The housing has side walls 12 and end walls 13 preferably provided with lugs 14 extending through apertures 15 provided in the member 11 for attaching the housing thereto. A block 16 of a suitable material, such as nylon, is located in the housing and the upper side of the block is preferably provided with a groove 17, constituting a guide means, track, or guideway. The groove is curved in one direction, preferably toward the wiping edge of the wiper element as shown in FIGURES 3 and 6 and is also curved in another direction in a plane substantially transverse to the wiping edge of the wiper element as exemplified in FIGURE 5 of the drawing. Otherwise expressed, the component 9 or connector on the blade unit is provided with guide means, a track, or a guideway which is curved at least in two different directions. One of these directions is substantially perpendicular to the surface to be wiped as illustrated in FIGURE 3 and in another direction substantially parallel to the surface to be wiped as shown in FIGURE 5. The use of the term "guide means," "track" or "guideway" is intended to include the structure shown and any formation or formations which are provided on one or more parts or portions of a component or connector carried by either the wiper arm unit or the wiper blade unit. In other words, the use of such terms is not limited to a groove in the block shown.

The housing of the connector or component 9 also preferably includes a top wall having a portion 18 adjacent one extremity of the housing, a portion 19 adjacent the other extremity of the housing and a curved portion 20 therebetween which substantially conforms to the curvature of the guideway. The portion 18 of the top wall is provided with a generally rectangular opening 21 for obtaining access to the guideway. As further exemplified in FIGURES 3, 4 and 5 of the drawing, the guideway is generally rectangular in cross-section and the base wall of the groove is preferably inclined or is provided with what may be termed a conical, spherical, or ellipsoidal surface 22, the purpose of which will be explained more in detail subsequently. It can be stated that the connector is provided with a compound curve.

The other component 10 of the connection means is carried by the wiper arm unit and is preferably made in the form of an entering part 23 which is curved in a manner to substantially correspond with the curvature or shape of the guideway of the component 9 carried by the wiper blade unit. More specifically in this respect, the entering part is preferably made in the form of a hook which is curved in a direction toward the wiping edge of the wiping element as shown in FIGURE 3 and also in a direction substantially transverse to the wiping edge of said element. Expressed in another way, the entering part is curved in a plane corresponding substantially to the fore-and-aft movement of the wiper arm and also is curved in a direction corresponding substantially to the direction that the wiper arm travels as it oscillates back and forth across the windshield. It will be noted that the entering part is also formed so that it is at least provided with a lower conical, spherical, or ellipsoidal surface 24 which cooperates with the groove or guideway. The cross-sectional dimensions of the entering part are preferably slightly less than the cross-sectional dimensions of the guideway so as to control, within practical limits, the relative movement between the components of the connection means. To assemble the components it is merely necessary to insert the entering part through the opening 21 in the housing so that the entering part is seated in the guideway.

Referring now to the arrangement illustrated in FIGURES 1 and 2 of the drawing, the invention affords a setup whereby controlled relative movement may automatically take place between the wiper arm unit and the blade unit so that as the arm is oscillated by the drive shaft, the blade will wipe the unshaded area indicated by numeral 25 in FIGURE 2. When the blade is in a parked position the blade will automatically take an angular position with respect to the longitudinal axis of the wiper arm and as the arm and blade are driven to the left, as viewed in FIGURE 2, the blade will gradually pivot and assume a greater angularity with respect to the wiper arm at an intermediate dotted line position 26, and as the blade moves outwardly and rearwardly on the wing portion 2 of the windshield the angularity of the blade unit will increase as indicated at the dotted line position 27. During this movement of the blade across the windshield the blade will also tilt so that the blade will be normally maintained in an erect or substantially perpendicular position with respect to the surface to be wiped as shown in FIGURES 2 and 2a, in order that the blade may properly flop to obtain the proper wiping action and at the same time prevent any metal parts of the blade unit from engaging the glass. The conical, spherical, or ellipsoidal surface of the guideway or guide means and the shape of the entering part serve to impart the desired tilting action or relative movement between the wiper arm and blade as the blade moves across the windshield, particularly as the blade approaches the wing portion or is in engagement therewith. It will be noted in FIGURE 1 that the arm and blade carried thereby move rearwardly a distance indicated by numeral 28 and forwardly the same distance when they move from the parked full line position to the extreme left dotted line position and return to said parked position.

Having thus described by invention, it is obvious that various modifications may be made in the same without departing from the spirit of the invention; and, therefore, I do not wish to be understood as limiting myself to the exact form, construction, arrangement and combination of parts herein shown and described.

I claim:

1. A method of wiping the curved surface of a windshield which comprises interposing a resiliently flexible wiper blade between such surface and a spring-pressed arm carrying the blade, oscillating the arm so the blade will traverse the surface area to be wiped and during such traverse causing the blade, through the assistance of the curved surface and the force exerted by the arm, to swing relative to the arm and rock about its longitudinal axis to maintain the blade normal to such surface.

2. A method of wiping the curved surface of a windshield which comprises interposing a resiliently flexible wiper blade between such surface and a spring-pressed arm carrying the blade, oscillating the arm so the blade will traverse the surface area to be wiped and during such traverse causing the blade, through the assistance of the curved surface and the force exerted by the arm, to rock relative to the arm and also about its longitudinal axis to maintain the blade normal to such surface.

3. A method of wiping a curved surface of a windshield by a resiliently flexible wiper blade mounted on a spring-pressured arm which comprises substantially simultaneously moving the blade relative to the arm and across the surface by the arm while causing the blade in response to arm pressure and curvature of the surface to freely pivot relative to the arm to vary the angularity between the longitudinal axes of the blade and arm and tilt about its longitudinal axis and relative to the longitudinal axis of the arm to maintain the blade substantially normal to the surface being wiped.

4. A method of wiping a curved surface of a windshield by a resiliently flexible wiper blade movably mounted on a spring-pressed arm which comprises moving the blade across the surface by the arm, causing the blade in response to arm pressure and curvature of the surface to substantially simultaneously move and pivot relative to the arm to vary the angularity between the blade and arm in a plane normal to the curved surface, pivoting the blade to vary the angularity between the longitudinal axes of the blade and arm, and tilting the blade about its longitudinal axis and relative to the longitudinal axis of the arm to maintain the blade substantially normal to the surface being wiped.

5. A method of wiping a curved surface by a resiliently flexible blade mounted on a spring-pressed wiper arm, which comprises moving the blade in a conical path relative to the arm to tilt the blade about its longitudinal axis to maintain it normal to such surface when it is driven thereon by the arm.

References Cited by the Examiner

UNITED STATES PATENTS

| | | | |
|---|---|---|---|
| 2,260,905 | 10/41 | Horton | 15—250.32 |
| 2,274,277 | 2/42 | Rousseau et al. | 15—250.33 |
| 2,691,186 | 10/54 | Oishei et al. | 15—250.21 |
| 2,979,425 | 4/61 | Krohm | 134—6 |

CHARLES A. WILLMUTH, *Primary Examiner.*